Patented Feb. 25, 1947

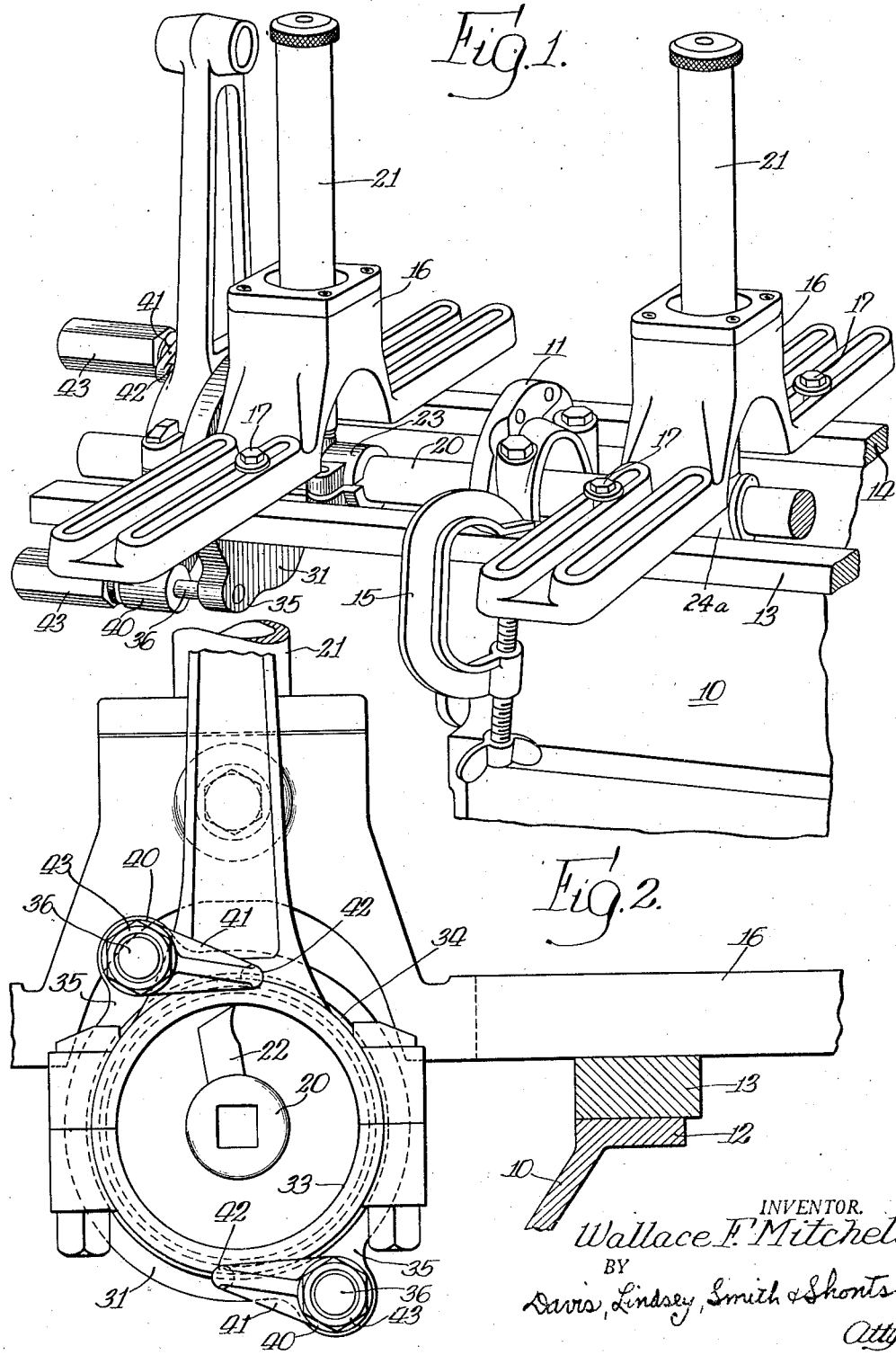

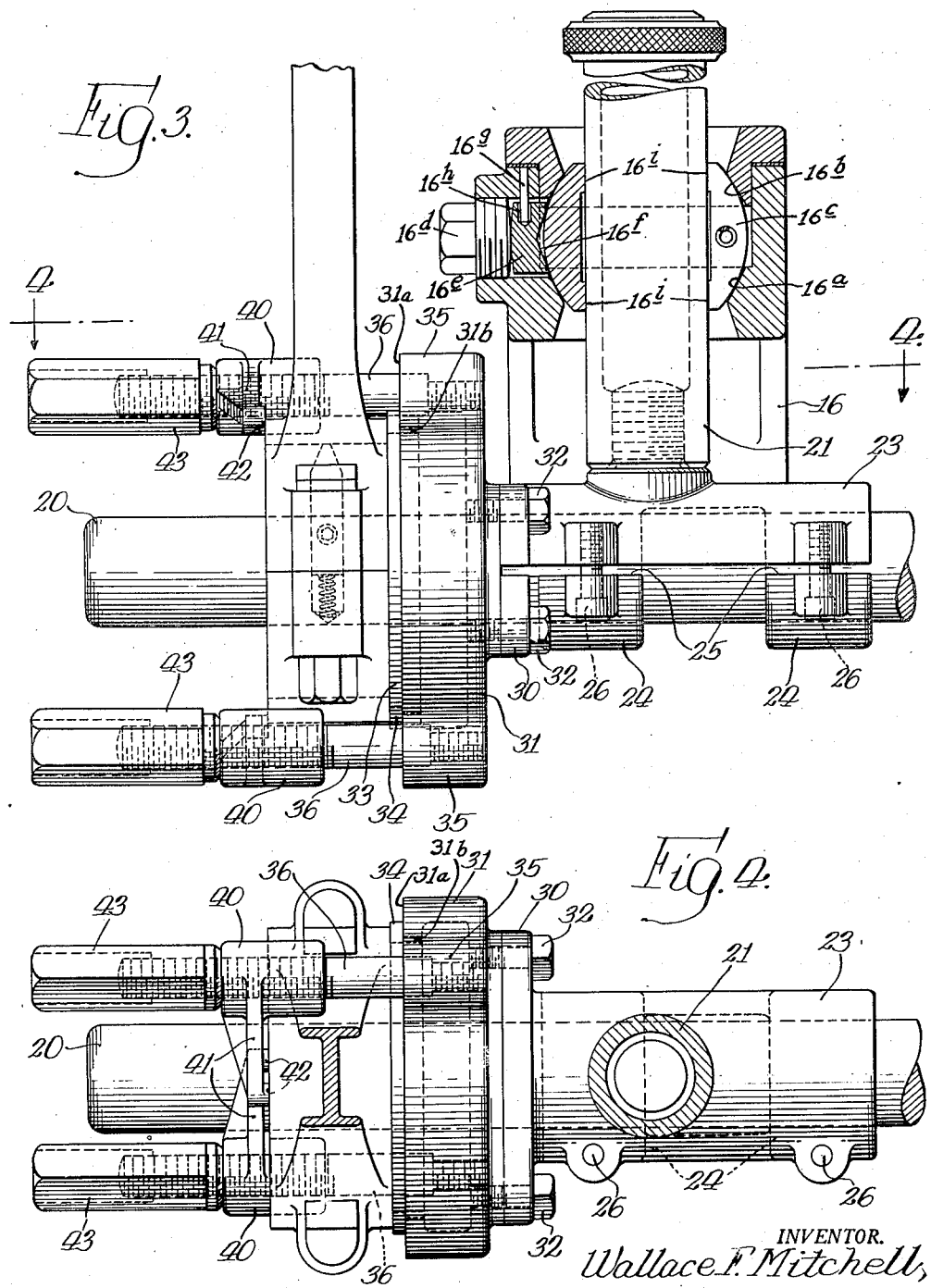

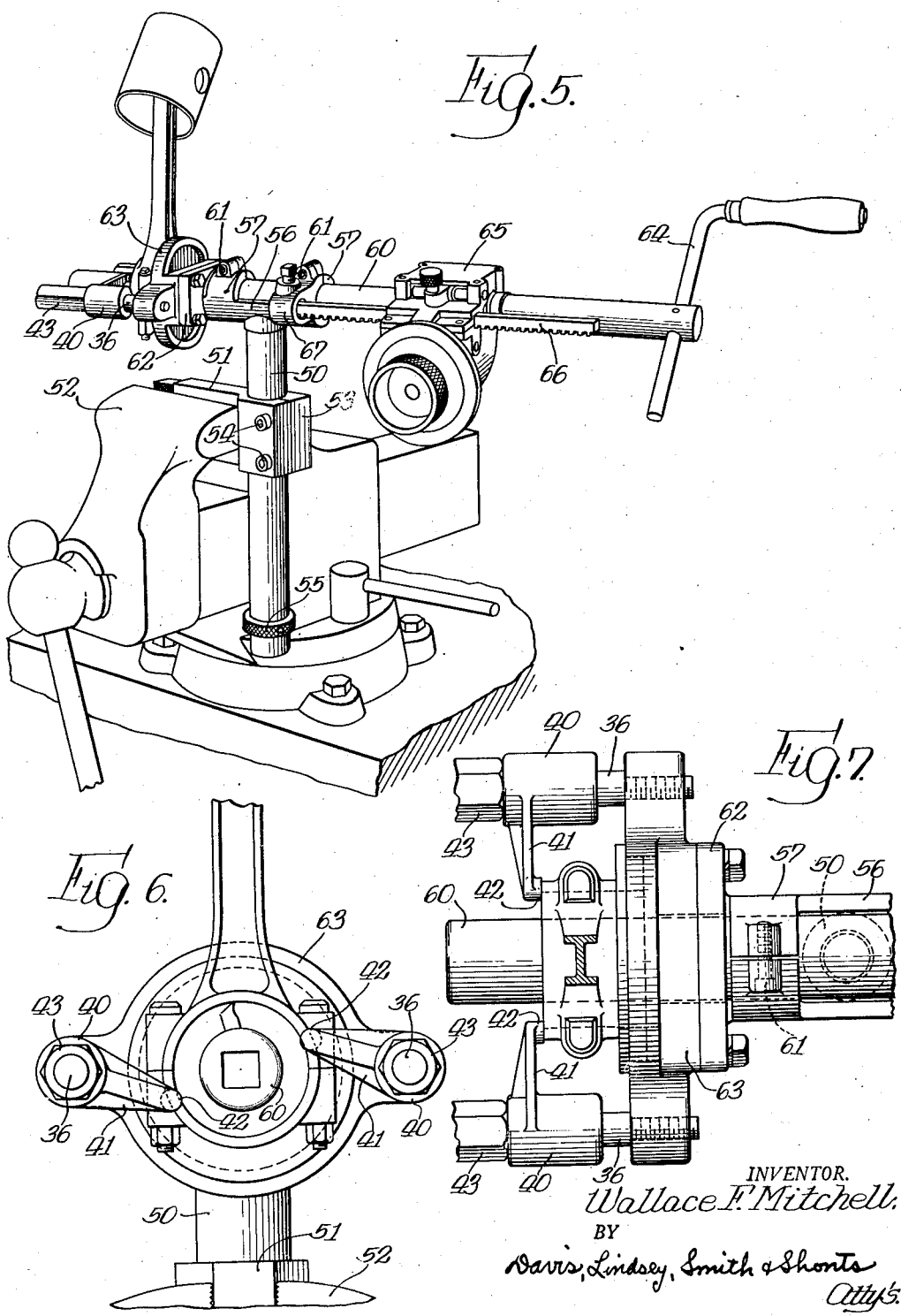

2,416,402

UNITED STATES PATENT OFFICE 2,416,402

BORING MACHINE

Wallace F. Mitchell, Chicago, Ill., assignor to Ammco Tools, Inc., a corporation of Illinois Application September 29, 1944, Serial No. 556,312

6 Claims. (Cl. 77—2)

The invention relates generally to boring machines and more particularly to a machine for boring the crank pin bearings of connecting rods of the type utilized in internal combustion engines and the like, such as air compressors, etc.

The general object of the invention is to provide a novel boring machine for the above-mentioned type of bearings, which is particularly adapted for use in automobile repair shops and garages.

Another object is to provide a novel boring machine for boring bearings of the foregoing character, which machine is of such construction that it may be classed as a portable machine and thus is of particular use in a shop such as an automobile repair shop for reboring the crank pin bearings of connecting rods as an incident to the overhauling and reconditioning of automobile engines.

It is also an object to provide a machine for boring connecting rod bearings, which may be made solely for boring work of such character or which may be incorporated in a machine for boring the bearings of an engine cylinder block.

A further object is to provide a novel machine for boring connecting rod bearings, in which the connecting rod may be clamped with its bearing accurately aligned with the boring bar and the boring tool fed through the bearing in a positive and uniform manner.

Still another object is to provide a machine for boring connecting rod bearings, which may be easily set up for the boring operation, in which the connecting rod may be readily clamped in proper position, and in which the boring operation may be readily performed with a high degree of accuracy.

A still further object is to provide a novel machine for boring connecting rod bearings, which is readily adaptable for connecting rods of various size and having bores of various diameters.

Other objects and advantages become apparent from the following description taken in connection with the accompanying drawings, in which:

Figure 1 is a fragmentary perspective view of a machine embodying the features of the invention and incorporated as a part of a machine for boring the line bearings of a cylinder block.

Fig. 2 is an enlarged fragmentary end elevational view of the machine shown in Fig. 1.

Fig. 3 is an enlarged fragmentary side elevational view, partially in section, and showing the manner in which a connecting rod is supported in the machine shown in Fig. 1.

Fig. 4 is a horizontal sectional view taken on the line 4—4 of Fig. 3.

Fig. 5 is a perspective view of another form of the machine.

Fig. 6 is a fragmentary end elevational view of the machine shown in Fig. 5.

Fig. 7 is a fragmentary plan view of the machine shown in Fig. 5.

The present application is a continuation-in-part of my copending application Serial No. 479,579, filed March 18, 1943, which became Patent No. 2,401,838 of June 11, 1946.

A machine having the features of the present invention may be and is here shown as embodied in two different forms, one form being such that it is incorporated in a machine for boring the line bearings of a cylinder block for an automobile engine, as shown in Figs. 1 to 4, inclusive, and the other form being adapted to be mounted in some suitable position as in a vise on a work bench.

The present machine in each of its forms comprises generally a supporting structure in which a boring bar is mounted both for rotation and for longitudinal feeding movement. The supporting structure is provided with means by which connecting rods of various sizes may be clamped concentrically with the boring bar so that the crank pin bearings of such connecting rod may be accurately rebored. Thus, the machine includes means for clamping the connecting rod in accurate alignment with the boring bar, and the boring tool may be fed through the bearing of the connecting rod in a positive and uniform manner. Both of the embodiments of the invention herein disclosed provide a machine particularly adapted for use in automobile repair shops and provide a convenient means for refinishing the crank pin bearings of the connecting rods as an incident to the overhauling and reconditioning of automobile engines.

As mentioned above, the form of machine shown in Figs. 1 to 4 of the drawing is such that reboring of connecting rods may be performed on and by a machine designed for boring line bearings, such as the cam and crankshaft bearings in the cylinder block of an internal combustion engine. In the particular form of construction shown in these figures, the machine is of such character that it is adapted to be mounted directly on such a cylinder block and to be carried thereby during operation for boring the line bearings of the block as well as for operation during boring of the connecting rods. As shown in the drawings, the cylinder block, indicated at 10, is provided with a plurality of line bearings, one of which is shown at 11. For the purpose of mounting the machine on the block, the latter is inverted so that the bearings are upward, and the machine is adapted to be mounted on and secured to the crankshaft pan rails 12 of the cylinder block. The boring operation is adapted to be performed with the caps of the various bearings and the bearing inserts in assembled relation with the cylinder block without necessitating their removal.

The machine comprises a pair of parallel rails 13 and 14 adapted to be mounted on the pan rails 12 and secured thereto by means such as C-clamps, one of which is shown at 15. The clamps 15 thus hold the rails rigidly on the cylinder block and in spaced, parallel relation to each other. Connecting the rails 13 and 14 is a plurality of bridge members, two of which are shown at 16, rigidly secured to the rails as by screws 17 in spaced relation along the rails. Preferably, the bridge members 16 are so located that there is one of them at each end of the rails beyond the ends of the cylinder block and other bridge members are located intermediate the line bearings of the cylinder block to provide rigid supports therebetween.

Rotatably carried by the bridge members is a boring bar 20 extending through the various bearings 11 and beyond the ends of the cylinder block. The boring bar 20 is supported by each of the bridge members 16, and to this end each bridge member is provided with an upright 21 adjustably mounted in the bridge member and provided with means such as bearings 24 and 24a at its lower end for rotatably supporting the boring bar 20. In setting up the machine, after the rails 13 and 14 are clamped to the cylinder block and the bridge members 16 are secured to the rails by the screws 17, the boring bar 20 is preferably aligned or centered with the two end bearings of the cylinder block by means of a centering device such as shown in my parent application. When the boring bar is so centered, the uprights 21 of the two end bridge members are then clamped in place to rigidly hold the boring bar in its aligned position. Thereafter, the uprights 21 of the intermediate bridge members are clamped in place to support the boring bar in the position determined by the uprights 21 of the two end bridge members.

The boring bar support above referred to includes a universal connection between the bridge member 16 and the upright 21 which permits of relative vertical and angular displacement so that the boring bar will be supported in such a manner as to bore all of the aligned bearings of the cylinder block in true axial alignment with each other.

The foregoing structure is fully described in my parent application and, briefly, it includes a pair of axially spaced, tapered, annular seats 16$^a$ and 16$^b$ provided in the upper part of the bridge member 16. A segmental tubular ball-like member 16$^c$ having three equally and similarly shaped segments (not shown) receive the upright 21, the ball-like member 16$^c$ being confined against the seats 16$^a$ and 16$^b$ for a ball-like universal action. As explained in my parent application, the segments of the ball-like member 16$^c$ are yieldingly spread apart by suitable springs so that they are normally held against the seats 16$^a$ and 16$^b$ with the segmental parts thereof sprung apart to an extent to permit the upright member 21 to pass freely therebetween. However, when the upright 21 is so passed through the ball-like member 16$^c$, the segments of each member are clamped tightly against the upright in such a way as to insure a uniform clamping action for all segments without distortion of the unit and boring bar carried thereby. The clamping means employed is such as to provide a positive and firm clamping or locking action upon but slight pressure by the operator.

This clamping action is accomplished by an adjustable clamping nut 16$^d$ so located that its axis extends substantially parallel with the axis of the boring bar 20. This nut is threaded for reception in a threaded opening in the body of the bridge member 16 with its inner end engaging (but not fastened to) a so-called compression plug 16$^e$ having at its inner end a conical seat 16$^f$ which engages the adjacent spherical surface of the adjacent one of the segments of the ball member 16$^c$. The plug 16$^e$ is a floating member, so to speak, permitting it to adjust itself to the engaged segment without a cramping action which would tend to distort the setup. Though this plug is floating and free to adjust itself as stated, it is prevented from displacement rotatively when the clamping nut 16$^d$ is set up by a pin 16$^g$ carried by the bridge member 16, which pin extends into an enlarged opening 16$^h$ in the adjacent wall of the plug 16$^e$. The opening 16$^h$ is large enough to permit sufficient play in the plug 16$^e$ to permit of the adjustment above referred to while avoiding any torsional effects that would tend to distort in the setting up of the plug 16$^e$.

With the foregoing arrangement, when the plug 16$^e$ is tightened, the segments of the ball-like member 16$^c$ are uniformly moved toward each other and the upright 21 to effect a clamping action and, since the force applied through the plug 16$^e$ is in a direction parallel with the axis of the boring bar 20 and at right angles to the axis of the upright 21, all tendency to laterally distort the boring bar 20 is avoided.

Furthermore, to insure a uniform and positive clamping action between the segments of the ball-like member 16$^c$ and the upright 21, each of the segments of the member 16$^c$ is provided on its inner face with spaced-apart bearing surfaces 16$^i$ so that each segment engages the upright 21 at spaced-apart points substantially in alignment with the ball seats 16$^a$ and 16$^b$. Thus the segments of the ball-like member 16$^c$ always clampingly engage the upright 21 at spaced-apart points and at direct pressure-applied points, thereby insuring a multiple clamping engagement upon the tightening of the plug 16$^e$. It will be seen that when the plug 16$^e$ is tightened, the segments of the ball member 16$^c$ not directly engaged by the plug 16$^e$ are brought into tight clamping engagement with the seat surfaces 16$^a$ and 16$^b$ while the segment engaged by the plug 16$^e$ is moved away from such seats when the segments are brought together and contracted upon the upright 21. At this time the support normally afforded the latter segment by the seats 16$^a$ and 16$^b$ is now provided by the conical face of the compression plug 16$^e$ so that all of the segments are fully and firmly supported with an equalized pressure applied substantially throughout the circumference of not only the ball support but the upright 21. Such equalization of pressure avoids distortion of any of the parts involved which might be transmitted to the boring bar and cause inaccurate boring.

The boring bar 20 is provided with a plurality of apertures (not shown) at spaced points along its length to receive a radially extending boring tool, such as shown at 22 in Fig. 2, one of such apertures being located outside of one of the end bridge members for boring a connecting rod bearing. The boring tool or bit 22 is adapted to be set to the proper radial distance to bore the correct diameter, by means of a micrometer setting device such as is disclosed in Serial No. 522,764, filed February 17, 1944, which is a division of my parent application.

The foregoing brief description of the machine shown in Figs. 1 to 4, inclusive, discloses the construction thereof when the machine is adapted for boring the line bearings of a cylinder block. However, such machine may also be constructed so that the crank pin bearings of connecting rods may be bored while the machine is mounted upon the cylinder block 10. For this purpose, the end bridge member 16 supports an upright 21 which is provided with means for clamping a connecting rod thereto in concentric relation with the boring bar 20. Thus, as shown in Figs. 1 to 4 of the drawings, the upright 21 in the end bridge member 16 is provided on its lower end with means for supporting the boring bar at axially spaced points. As shown herein, the lower end of the upright 21 is provided with a laterally extending head 23 shaped to provide a pair of bearings 24 supporting the boring bar 20 at axially spaced points. The bearings 24 are preferably split, as at 25, at one side so that the two sides of the split in each bearing may be drawn together, as by a screw 26, to firmly hold the boring bar in a properly centered position. As mentioned above, such centering of the boring bar is performed during the mounting of the machine on the cylinder block.

For the purpose of supporting a connecting rod in concentric relation to the boring bar, the outer bearing 24 is provided with a flange 30 to which a face plate member 31 is rigidly secured, as by screws 32. The face plate member 31 is annular in form and has a face 31a normal to the axis of the bearing 24 and an internal diameter 31b adapted to receive a face ring 33 against which the connecting rod is adapted to be clamped. The face ring 33 has an outwardly extending flange 34 adapted to lie flat against the outer face of the face plate member 31 and providing a surface transverse to the axis of the boring bar, against which one face of the connecting rod bearing abuts to hold the latter in proper position. It is contemplated that a plurality of face rings 33 will be provided for the machine, with the face rings having different internal diameters to provide for a plurality of sizes of connecting rods, thus providing a surface against which connecting rods of various sizes may be radially clamped. In each case, however, the internal diameter of the face rings 33 is of slightly larger size than the diameter of the bearing in the connecting rod to be bored, so that the boring tool in moving through the connecting rod bearing will not contact the face ring 33.

To clamp the connecting rod against the face ring 33, the face plate member 31 is provided with a pair of radially extending ears 35 to support a pair of threaded rods 36 in parallel relation to the boring bar 20. Preferably, the ears 35 are positioned diametrically opposite each other. Slidably mounted on the threaded rods 36 are clamping members 40, each comprising a hub portion mounted on the rod 36, and a radially extending arm 41 provided at its free end with a boss 42 to abut against the outer face of the connecting rod and clamp it against the flange 34 of the face ring 33. The clamping members 40 are held rigidly in clamping relation with the connecting rod by means of elongated hexagonal nuts 43 threaded on the outer ends of the rods 36.

In use, the machine is set up upon the cylinder block 10 as heretofore described. When it is desired to utilize the machine for boring a connecting rod, a face ring 33 of a size suitable for the particular connecting rod to be bored is mounted in the face plate member 31. The connecting rod is then placed over the boring bar 20 in abutting engagement with the end face of the flange 34 of the face ring 33, and the bearing of the connecting rod is then aligned or centered with the boring bar by means of a centering device such as shown in my parent application and my Patent No. 2,391,183, issued December 18, 1945, on application Serial No. 522,765, filed February 17, 1944, as a division of said parent application. When the bearing of the connecting rod is so centered, the clamping members 40 are tightened by means of the nuts 43 against the outer face of the connecting rod to rigidly clamp it against the face ring 33. The clamping members 40 being slidable on the rods 36 provide for clamping of connecting rods having different lengths of bearings, and by swinging the clamping members 40 on the rods 36, the bosses 42 thereof may be swung about the axes of the rods 36 so that connecting rods having bearings of varying diameters may be rigidly clamped in proper position.

After the connecting rod has been so clamped in position, the boring tool or bit 22 is set to the proper radial distance to bore the correct diameter in the bearing of the connecting rod, by means of a micrometer setting device such as disclosed in Serial No. 522,764, filed February 17, 1944, which is a division of my parent application. With the boring tool so set, the boring operation may then be performed by rotatably driving the boring bar 20 and feeding it longitudinally to move the tool through the bearing of the connecting rod, the means for rotating the boring bar and for feeding it not being shown herein but being fully disclosed in my parent application.

In the embodiment shown in Figs. 5, 6 and 7, the machine is of substantially the same character as shown in Figs. 1 to 4, inclusive, except that, instead of being incorporated as part of a machine for boring the line bearings of a cylinder block, it is of unitary character adapted to be mounted on a work bench. To this end, the machine shown in these figures includes supporting structure comprising an upright 50 adjustably clamped in a block 51. The block 51 is of suitable form to be readily gripped in the jaws of a vise 52 of the character commonly found in automobile repair shops. In its preferred form, the block 51 comprises an elongated portion adapted to be clamped between the jaws of the vise and to extend sidewardly therefrom with an enlarged head 53 bored to receive the upright 50 and split so that the head 53 may clamp the upright as by tightening screws 54. The upright 50 is of substantial length so that it may be vertically adjusted to bring the machine in a convenient position for the operator, the lower end of the upright being provided with a collar 55 to prevent the supporting block 51 from sliding off the upright when the block is removed from the vise.

The upper end of the upright 50 is provided with a head 56 having a pair of longitudinally spaced bearings 57 in which the boring bar, here indicated at 60, is adjustably supported. The bearings 57 are split so that the parts thereof may be drawn together, as by screws 61, to hold the boring bar in accurate alignment therewith.

One of the bearings 57 is provided with a flange 62 to support a face plate member 63 of the same construction as shown in the previous form of the machine. The face plate member 63 is provided with a face ring and clamping means similar to those shown in Figs. 1 to 4, inclusive.

To effect rotation of the boring bar, the end thereof opposite the end carrying the boring tool may be provided with a hand crank 64 by which it may be rotated or an electric power drill (not shown) may be secured thereto to effect rotation of the boring bar. The end of the boring bar carrying the hand crank 64 is also provided with a feed device 65 of the character disclosed in my parent application and a division thereof, Serial No. 553,320, filed September 9, 1944. Such feed device is carried on the boring bar and is adapted to effect longitudinal feeding movement of the bar during rotation thereof so that the boring tool will be moved through the bearing of the connecting rod to effect boring thereof. The feed device 65 is provided with a feed bar 66 adapted to be connected to a fixed part of the machine to provide for the longitudinal feeding movement. Preferably, such feed bar 66 is connected to a lug 67 formed integrally with the adjacent bearing 57 in a manner similar to that disclosed in my parent application and a division thereof, Serial No. 553,320, filed September 9, 1944.

In using the machine shown in Figs. 5, 6 and 7, the block 51 is first clamped in the vise 52. The screws 54 in the block 51 are then loosened and the upright 50 raised or lowered to bring the various parts of the machine in convenient position for operation, the screws 54 thereafter being tightened to clamp the upright in place. The boring bar 60 is then centered in the bearings 57 by tightening the screws 61 thereof. The machine is now ready for mounting the connecting rod thereon and, preparatory thereto, the proper size face ring is selected and placed in the face plate member 63. The connecting rod is slipped over the end of the boring bar and centered relative thereto by a centering device such as shown in my parent application and said Patent No. 2,391,183 and clamped in place by the clamping members. The boring tool is thereupon set to bore the desired diameter, by means of the micrometer setting device shown in my application Serial No. 522,764, filed February 7, 1944. The machine is thereby made ready for operation, which is effected by rotating the boring bar by means of the hand crank 64 or an electric drill, with the feed device 65 effecting longitudinal feed of the boring bar to move the tool axially through the connecting rod bearing.

From the foregoing description, it will be apparent that I have provided a novel machine for reboring the crank pin bearings of connecting rods of the type utilized in internal combustion engines. The machine may be of a form adapted to be incorporated in and as a part of a machine for reboring the aligned bearings of a cylinder block, as shown in Figs. 1 to 4, or may be a separate machine designed and constructed only for reboring connecting rods, such as shown in Figs. 5, 6 and 7. Either form of the machine provides for reboring connecting rods of a wide variety of sizes which may be accommodated by interchange of the face rings and by swinging the clamping arms to abut against the outer face of the connecting rod bearing. The work performed by the machine is highly accurate since the boring bar is rigidly held in alignment with the supporting bearings of the machine and the connecting rod is rigidly clamped in the machine and accurately held in concentric relation with the boring bar. The boring tool may be accurately set to bore the desired diameter and the boring bar may be conveniently rotated to effect the cutting action either through the hand crank 64 or by an electrically operated drill, the feeding of the boring bar being effected by means of the feed device 65.

I claim:

1. In a boring apparatus comprising a boring bar, bearing means for said boring bar and supporting means for said bearing means, the provision of a further bearing means adaptable to said boring bar, said further bearing means being adjustable to fit and center it accurately on said boring bar, universal connecting means having a portion secured to said bearing means and a portion securable to said supporting means, and a connecting rod supporting means rigidly secured to said further bearing means.

2. In a boring apparatus comprising a boring bar, bearing means for said boring bar and supporting means for said bearing means, the provision of a further bearing means adaptable to said boring bar, universal connecting means having a portion secured to said bearing means and a portion securable to said supporting means, and a connecting rod supporting means rigidly secured to said further bearing means, and means associated with said universal connecting means to lock said connecting means to secure said further bearing means rigidly with respect to said supporting means.

3. In a boring apparatus comprising a boring bar, bearing means for said boring bar and supporting means for said bearing means, the provision of a further bearing means adaptable to said boring bar, said further bearing means being adjustable to fit and center it accurately on said boring bar, universal connecting means having a portion secured to said bearing means and a portion securable to said supporting means, a connecting rod supporting means rigidly secured to said further bearing means, and adjustable clamping means to secure connecting rods of different sizes in centered relation on said connecting rod supporting means.

4. In a boring apparatus comprising a boring bar, a boring tool carried by said boring bar, bearing means for said boring bar and supporting means for said bearing means, the provision of a further bearing means adaptable to said boring bar, universal connecting means having a portion secured to said bearing means and a portion securable to said supporting means, a connecting rod supporting means rigidly secured to said further bearing means, said connecting rod supporting means having an opening therein for the passage of said boring bar and boring tool therethrough, said connecting rod supporting means also having a face normal to the axis of said bearing, a face ring having an internal diameter to pass said boring bar and tool and having a portion of an external diameter to fit within said opening of the connecting rod supporting means and having oppositely therefrom an annular flange with a face adapted to fit against the face of said connecting rod supporting means and an end face normal to the axis of said boring bar adapted to engage a connecting rod, and adjustable clamping means to clamp a connecting rod against said flange in centered relation to said boring bar.

5. A boring apparatus comprising a boring bar, a boring tool carried by said boring bar, bearing means for said boring bar, supporting means for said bearing means, a connecting rod supporting member secured to said bearing means, said connecting rod supporting means having an opening therein for the passage of said boring bar and boring tool therethrough, said connecting rod supporting means also having a face normal to the axis of said bearing, a face ring of an internal diameter to pass said boring bar and tool and having a portion of an external diameter to fit within said opening of the connecting rod supporting means and having oppositely therefrom an annular flange with a face adapted to seat against the face of said connecting rod supporting means and an end face normal to the axis of said boring bar adapted to engage a connecting rod, and adjustable clamping means to clamp a connecting rod against said flange and centered adjacent to said boring bar.

6. A boring apparatus comprising a boring bar, a boring tool carried by said boring bar, bearing means for said boring bar, supporting means for said bearing means, a connecting rod supporting means secured to said bearing means, said connecting rod supporting means having an opening therein for the passage of said boring bar and boring tool therethrough, said connecting rod supporting means also having a face normal to the axis of said bearing, a face ring of an internal diameter to pass said boring bar and tool and having a portion of an external diameter to fit within said opening of the connecting rod supporting means and having oppositely therefrom an annular flange with a face adapted to fit against the face of said connecting rod supporting means and an end face normal to the axis of said boring bar adapted to engage a connecting rod, adjustable clamping means to clamp a connecting rod against said flange and centered adjacent to said boring bar, and feeding means having portions given relative feeding movements, one of said portions being connected to said boring bar and another of said portions being connected to said bearing means.

WALLACE F. MITCHELL.

REFERENCES CITED

The following references are of record in the file of this patent:

UNITED STATES PATENTS

| Number | Name | Date |
| --- | --- | --- |
| 1,967,387 | Welke | July 24, 1934 |
| 2,252,121 | Fuglie | Aug. 13, 1941 |
| 2,349,526 | Sunnen | May 23, 1944 |
| 1,417,278 | Peters | May 23, 1922 |
| 2,015,940 | Keller | Oct. 1, 1935 |
| 1,651,286 | Locken | Nov. 29, 1927 |
| 2,053,644 | Tuttle | Sept. 8, 1936 |